US00RE47671E

(19) United States
(12) Reissued Patent
Nakamura et al.

(10) Patent Number: US RE47,671 E
(45) Date of Reissued Patent: Oct. 29, 2019

(54) VEHICLE-BODY FRONT STRUCTURE OF VEHICLE

(71) Applicant: MAZDA MOTOR CORPORATION, Hiroshima (JP)

(72) Inventors: Satoshi Nakamura, Hiroshima (JP); Hiroaki Takeshita, Hiroshima (JP); Masanobu Kobashi, Hiroshima (JP)

(73) Assignee: MAZDA MOTOR CORPORATION, Hiroshima (JP)

(21) Appl. No.: 15/593,041

(22) Filed: May 11, 2017

Related U.S. Patent Documents

Reissue of:
(64) Patent No.: 9,027,695
Issued: May 12, 2015
Appl. No.: 13/854,649
Filed: Apr. 1, 2013

(30) Foreign Application Priority Data

Apr. 2, 2012 (JP) ..... 2012-083786

(51) Int. Cl.
*B62D 21/15* (2006.01)
*B60R 19/34* (2006.01)

(52) U.S. Cl.
CPC ..... *B62D 21/155* (2013.01)

(58) Field of Classification Search
None
See application file for complete search history.

(56) References Cited

U.S. PATENT DOCUMENTS 6,398,292 B2 * 6/2002 Tsuruta ..... B60N 2/4221 296/187.09
6,957,846 B2 * 10/2005 Saeki ..... 296/187.1
7,900,995 B2 * 3/2011 Sato et al. ..... 296/187.1
8,746,718 B2 * 6/2014 Otani ..... B60G 7/02 280/124.109
2002/0163211 A1 11/2002 Hagen
2004/0195862 A1 10/2004 Saeki ..... B62D 21/152 296/187.09
2009/0085362 A1 * 4/2009 Terada ..... B60R 19/34 293/132
2010/0066106 A1 3/2010 Nojima et al.
(Continued)

FOREIGN PATENT DOCUMENTS

JP H06-27439 U 4/1994
JP 2006-103591 A 4/2006
(Continued)

*Primary Examiner* — Glenn K Dawson

(74) *Attorney, Agent, or Firm* — Studebaker & Brackett PC

(57) ABSTRACT

A first projection portion projecting outward, in a vehicle width direction, from a front side frame is provided. A front end of the first projection portion is located at the same position, in the vehicle longitudinal direction, as a connection portion of a crash can to the front side frame or located in back of the connection portion. An outward side face of the first projection portion is configured to slant rearward and inward in a plan view. The first projection portion and a power unit are arranged to overlap each other in the vehicle longitudinal direction. Accordingly, an impact transmitted to a vehicle-compartment side in a small overlap collision can be reduced, restraining repair costs of the crash can broken in a low-speed collision as well as maintaining appropriate design flexibility of a vehicle-body front portion.

19 Claims, 10 Drawing Sheets

(56) References Cited

U.S. PATENT DOCUMENTS

| | | | | |
|---|---|---|---|---|
| 2010/0066124 | A1* | 3/2010 | Terada | B60R 19/34 296/187.09 |
| 2012/0248820 | A1* | 10/2012 | Yasui et al. | B60R 19/34 296/187.09 |
| 2013/0241233 | A1 | 9/2013 | Ohnaka et al. | |
| 2013/0320709 | A1 | 12/2013 | Kuwabara et al. | |
| 2014/0062129 | A1* | 3/2014 | Syed et al. | 296/187.1 |
| 2014/0091598 | A1* | 4/2014 | Park et al. | 296/203.02 |
| 2016/0185391 | A1* | 6/2016 | Suzuki | B62D 21/152 296/187.11 |
| 2016/0318469 | A1* | 11/2016 | Matsumoto | B60R 19/34 |
| 2017/0036699 | A1* | 2/2017 | Asai | B62D 21/152 |

FOREIGN PATENT DOCUMENTS

| | | | |
|---|---|---|---|
| JP | 2006-137373 | A | 6/2006 |
| JP | 2006-137374 | A | 6/2006 |
| JP | 2006-175988 | A | 7/2006 |
| JP | 2008-265738 | A | 11/2008 |
| JP | 2009-214654 | A | 9/2009 |
| JP | 2010-006154 | A | 1/2010 |
| JP | 2010-184674 | A | 8/2010 |
| JP | 2013-203320 | A | 10/2013 |

* cited by examiner

PRIOR ART

VEHICLE-BODY FRONT STRUCTURE OF VEHICLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*The present application is a reissue application under 35 U.S.C. § 251 of U.S. patent application Ser. No. 13/854,649, filed Apr. 1, 2013, now U.S. Pat. No. 9,027,695, issued May 12, 2015.*

BACKGROUND OF THE INVENTION

The present invention relates to a vehicle-body front structure of a vehicle, in which a crash can is provided between a bumper beam and a front side frame.

Conventionally, a technology is known, in which a pair of right-and-left front side frames extending in a vehicle longitudinal direction is provided at a vehicle-body front portion so that an impact load is absorbed by the front side frames crushing in a front-end collision of a vehicle.

Herein, the front-end collision of the vehicle occurs at a vehicle-body portion which is located on an outward side, in a vehicle width direction, from the front side frame in some cases. This kind of front-end collision in which the vehicle body collides with an object with a small overlap-width in the vehicle width direction (e.g., about 25% of the vehicle width) is sometimes called "a small overlap collision."

In a case in which the object of the small overlap collision is a pole member, such as a utility pole or traffic sign, this pole member sometimes collides in a manner of sinking into a portion between the front side frame and a front wheel. In this case, there occurs a problem in that a transmission efficiency of a load transmitted to the front side frame may deteriorate. Further, even in a case in which the object of the small overlap collision is a non-pole member, such as another vehicle traveling in the opposite direction, the transmission efficiency of the load transmitted to the front side frame may improperly deteriorate, compared with a case in which the object and the vehicle body collide with each other in a wide overlap-width in the vehicle width direction. Therefore, there is a problem in that, in the case of the small overlap collision, the amount of impact absorption by deformation of the front side frame becomes so small that the impact load may be transmitted to a vehicle-compartment side improperly easily.

US Patent Application Publication No. 2004/0195862 A1 discloses a vehicle-body front structure shown in FIG. 10, which may become one countermeasure against the above-described problem. In a conventional structure shown in FIG. 10, a fork member 150 which extends forward, forking into two branches, is disposed between a front end of a front side frame 104 and a bumper beam 110. This fork member 150 comprises a straight-extending member 152 which extends forward from the front end of the front side frame 104 without slanting and an outward-slant member 154 which extends forward from the front end of the front side frame 104, slanting outward in a vehicle width direction. A rear end portion of the straight-extending member 152 and a rear end portion of the outward-slant member 154 are connected by bolts. According to this structure, even in the case of the small overlap collision, an impact load received at the outward-slant member 154 is transmitted to the front side frame 104, so that the impact can be absorbed by effectively deforming the front side frame 104. Thereby, the impact transmitted to a vehicle-compartment side can be reduced.

In general, a crash can is disposed between the front end of the front side frame and the bumper beam. In this case, in a case of a low-speed collision of 15 km/h, for example, the collision load can be absorbed only by deformation of the crash can, without any breakage of the front side frame. Thereby, repair costs can be reduced.

In this regard, in the above-described conventional structure shown in FIG. 10, if the above-described straight-extending member 152 has a low rigidity like the crash can, it may be considered that the collision load can be absorbed by deformation of the straight-extending member 152, without any breakage of the front side frame 104, in the low-speed collision. In this case, the straight-extending member 152 can be considered as the above-described crash can.

However, since not only the straight-extending member 152 but also the above-described outward-slant member 154 are arranged in front of the front side frame 104 in the structure shown in FIG. 10, when the impact load in the low-speed collision is absorbed by the deformation of the straight-extending member 152, the outward-slant member 154 gets broken as well as the straight-extending member 152. Therefore, the repair costs may increase more.

Meanwhile, in the conventional structure shown in FIG. 10, if the rigidity of the straight-extending member 152 is so large that the straight-extending member 152 cannot function as a crash can, the impact is directly inputted to the front side frame 104 even in the low-speed collision, so that the front side frame 104 gets damaged easily. Consequently, the repair costs may increase further.

Further, in general, while the bumper beam is provided such that its both ends extend to connection portions to crash cans, when the structure equipped with the outward-slant member 154 shown in FIG. 10 is applied, it is necessary to extend both ends of the bumper beam 110 further up to connection portions to the outward-slant member 154. Accordingly, it may be necessary that both end portions of a bumper 120 are bent rearward in a squire manner so as not to interfere with the both end portions of the long bumper beam 110. Therefore, the both end portions of the bumper 120 cannot be curved rearward smoothly in a shape illustrated by a two-dotted broken line R of FIG. 10, for example. Consequently, there is another problem in that the design of the vehicle-body front portion may be restricted.

SUMMARY OF THE INVENTION

Accordingly, an object of the present invention is to provide a vehicle-body front structure of a vehicle, in which a bumper beam and a front side frame are connected via a crash can, which can properly reduce the impact transmitted to the vehicle-compartment side in the small overlap collision, restraining repair costs of the crash can broken in the low-speed collision as well as maintaining appropriate design flexibility of the vehicle-body front portion.

According to the present invention, there is provided a vehicle-body front structure of a vehicle, comprising a bumper beam provided at a front portion of a vehicle body and extending in a vehicle width direction, a pair of right-and-left front side frames extending in a vehicle longitudinal direction, front end portions of which are connected to both end portions of the bumper beam via crash cans, a power unit arranged between the right-and-left front side frames, and first projection portions projecting outward, in the vehicle width direction, from the front side frames, wherein a front end of each of the first projection portions is located at the same position, in the vehicle longitudinal direction, as a connection portion of the crash can to the front side frame or located in back of the connection portion, a side face of the first projection portion which is located on an outward side in the vehicle width direction is configured to slant rearward and inward in a plan view, and the first projection portion and the power unit are arranged to overlap each other in the vehicle longitudinal direction.

According to the present invention described above, the impact load in the so-called small overlap collision can be received by the first projection portion projecting outward, in the vehicle width direction, from the front side frame. Further, since the side face of the first projection portion which is located on the outward side in the vehicle width direction is configured to slant rearward and inward in the plan view, the impact load received from the vehicle front by the first projection portion can be effectively transmitted to the front side frame.

Moreover, since the first projection portion and the power unit provided between the right-and-left front side frames are arranged to overlap each other in the vehicle longitudinal direction according to the present invention, the impact load transmitted to the front side frame from the first projection portion can be received by the heavy-weight power unit. Accordingly, the front side frame can be deformed stably in the small overlap collision, thereby providing more effective impact absorption. At the same time, the impact load can be dispersed to the power unit.

Thus, since the impact load can be effectively absorbed and dispersed at the vehicle-body front portion in the small overlap collision according to the present invention, the impact transmitted to the vehicle-compartment side can be properly reduced.

Also, since the front end of the first projection portion is located at the same position, in the vehicle longitudinal direction, as the connection portion of the crash can to the front side frame or located in back of the connection portion, when the impact absorption is achieved only by deformation of the crash can, without any damage of the front side frame, in the low-speed collision, the repair costs can be restrained by avoiding any damage of the first projection portion.

Further, since the first projection portion is provided in back of the crash can like this, the both end portions of the bumper can be arranged in outside spaces of the crash cans without any interference with the first projection portions. Accordingly, a design can be applied, in which the both end portions of the bumper curve rearward smoothly, passing beside the crash cans and through both-side spaces in front of the first projection portions, for example. Thus, the design flexibility of the vehicle-body front portion can be maintained appropriately.

According to an embodiment of the present invention, a rear end of the first projection portion is located in an area where the power unit exists in a side view such that the first projection portion and the power unit are arranged to overlap each other in the vehicle longitudinal direction. Thereby, since the overlap arrangement of the first projection portion with the power unit is achieved by locating the rear end of the first projection portion in the area where the power unit exists in the side view, when the front side frame bends inward in the small overlap collision, the front side frame can be stably deformed by contacting the front side frame with the power unit, thereby absorbing the impact properly.

According to another embodiment of the present invention, the power unit includes a parallel face portion which is provided substantially in parallel to the front side frame in a plan view, facing to the front side frame, and the rear end of the first projection portion is located in back of a front end portion of the parallel face portion of the power unit such that the first projection portion and the parallel face portion of the power unit are arranged to overlap each other in the vehicle longitudinal direction. Thereby, the impact load transmitted to the front side frame from the first projection portion can be received surely by the parallel face portion of the power unit. Accordingly, the impact absorption by the deformation of the front side frame and the load dispersion to the power unit in the small overlap collision can be achieved more effectively.

According to another embodiment of the present invention, the first projection portion is made of a member having a U-shaped cross section which comprises a pair of upper-and-lower flange portions extending in the vehicle longitudinal direction and joined to a side face of the front side frame which is located on an outward side in the vehicle width direction, an upper wall portion extending outward from a lower end of the upper flange portion, a lower wall portion extending outward from an upper end of the lower flange portion, and a side wall portion interconnecting outward end portions of the upper wall portion and the lower wall portion, and a front end portion of the first projection portion and a front end portion of the front side frame are joined to a plate member arranged along a face substantially perpendicular to the vehicle longitudinal direction. Thereby, since the first projection portion is a light-weight member having the U-shaped cross section comprising the pair of upper-and-lower flange portions, the upper wall portion, the lower wall portion, and the side wall portion, when the impact load is inputted to the first projection portion from the front, a load acting on joint portions of the upper-and-lower flange portions of the first projection portion to the side face of the front side frame can be reduced. Further, since the front end portion of the first projection portion and the front end portion of the front side frame are joined to the plate member arranged along the face substantially perpendicular to the vehicle longitudinal direction, when the impact load from the small overlap collision is inputted to the first projection portion, the impact load is also dispersed to the front side frame via the above-described plate member as well, thereby avoiding any excessive concentration of the impact load on the first projection portion. Accordingly, it can be avoided that the first projection portion is easily taken off the front side frame in the small overlap collision, so that the load transmission from the first projection portion to the front side frame can be achieved surely.

According to another embodiment of the present invention, a width, in a vertical direction, of the side wall portion of the first projection portion is configured to have the maximum width at a rear end portion of the side wall portion, and a recess groove extending in the vehicle longitudinal direction is formed at the side wall portion of the first projection portion by means of bead process. Thereby, since the width, in the vertical direction, of the rear end portion of the side wall portion of the first projection portion is configured to be maximum, the load transmission from the rear end portion of the side wall portion of the first projection portion to the power unit can be achieved in a wide range in the vertical direction. Accordingly, the impact load from the small overlap collision can be effectively transmitted to the power unit from the first projection portion via the front side frame. Further, since the recess groove extending in the vehicle longitudinal direction is formed at the side wall portion of the first projection portion by means of bead process, the strength against the load input from the vehicle front is increased. Accordingly, the impact load directly inputted from the obstacle which the vehicle collides with can be received surely by the first projection portion, so that the load transmission from the first projection portion to the front side frame can be achieved more surely.

According to another embodiment of the present invention, a sub frame supporting a suspension member for front wheel is arranged below the front side frame, and a second projection portion projecting outward, in the vehicle width direction, from the sub frame is arranged to overlap the first projection portion at least partially in the plan view. Thereby, the impact load from the small overlap collision can be received by the second projection portion as well as the first projection portion. Accordingly, the impact load can be effectively transmitted from the second projection portion to the sub frame, thereby promoting the impact absorption by the sub frame.

Other features, aspects, and advantages of the present invention will become apparent from the following description which refers to the accompanying drawings.

DETAILED DESCRIPTION OF THE INVENTION

Hereafter, preferred embodiments of the present invention will be descried referring to the accompanying drawings. In the following descriptions, the terms regarding directions, such as "front", "rear", "longitudinal", "left", "right", or "lateral", mean respective directions in a state where a vehicle's traveling direction is set as a "front" direction, except particular cases with notes.

Figure 1:
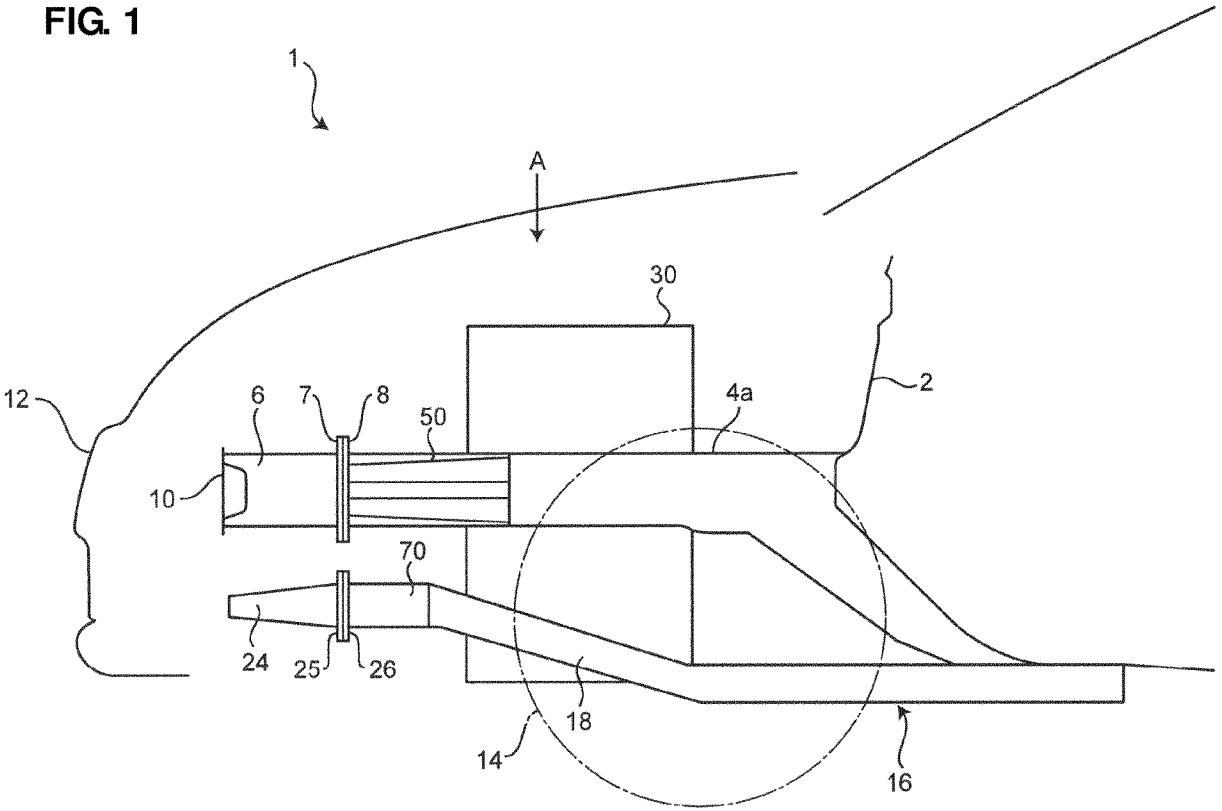
FIG. 1 is a side view showing a vehicle-body front structure of a vehicle according to an embodiment of the present invention.
Figure 2:
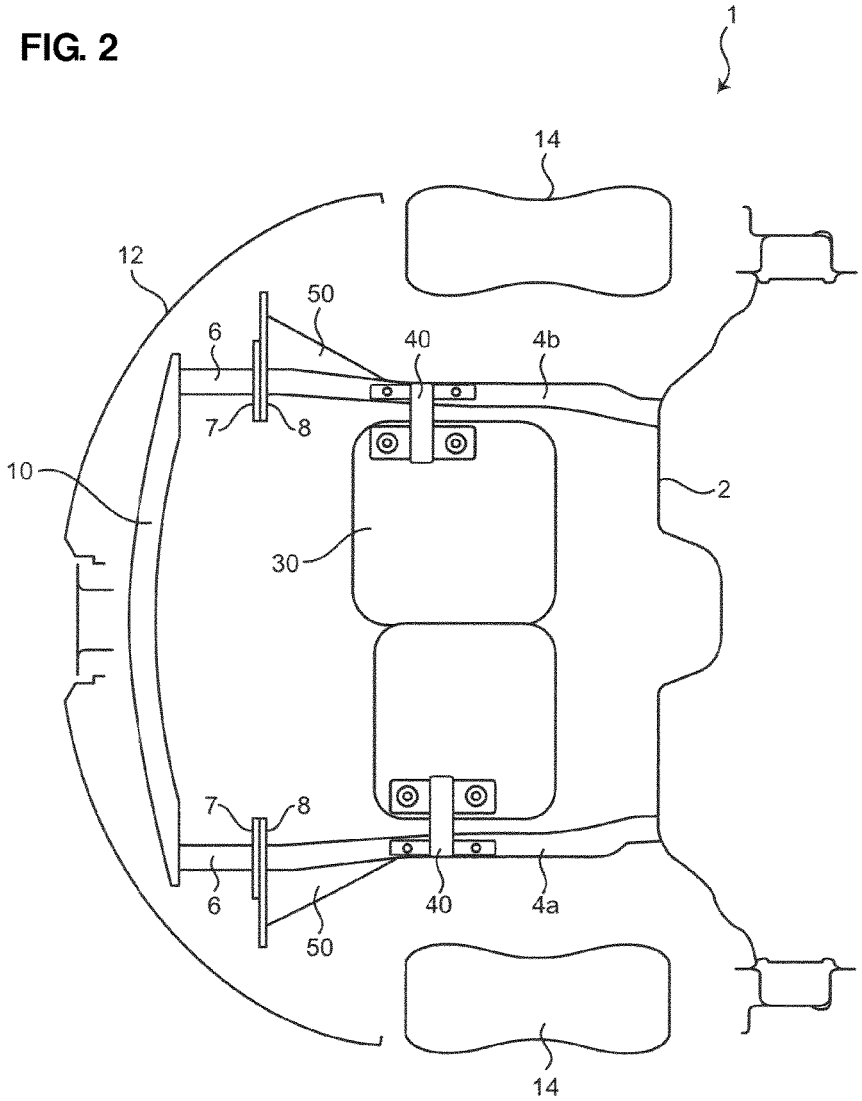
FIG. 2 is a plan view of the vehicle-body front structure shown in FIG. 1, when viewed from a specified direction indicted by an arrow A.

FIG. 1 is a side view schematically showing a vehicle-body front structure of a vehicle according to an embodiment of the present invention, and FIG. 2 is a schematic plan view of the vehicle-body front structure.

As shown in FIGS. 1 and 2, a pair of right-and-left front side frames 4 (4a, 4b) is provided to extend in a vehicle longitudinal direction in front of a dash panel 2 of a vehicle 1. Further, a bumper beam 10 is provided to extend in a vehicle width direction at a vehicle-body front portion of the vehicle 1.

Front end portions of the front side frames 4 are connected to both end portions of the bumper beam 10 via first crash cans 6. A first attaching plate 7 which is arranged along a face substantially perpendicular to the vehicle longitudinal direction is fixed to a rear end portion of the first crash can 6 by welding, for example. A first set plate 8 which is arranged along the face substantially perpendicular to the vehicle longitudinal direction is fixed to a front end portion of the front side frame 4 by welding, for example. The first attaching plate 7 and the first set plate 8, which are arranged to be overlapped each other, are connected by bolts, for example, at a connection portion of the first crash can 6 to the front side frame 4.

According to the structure described above, when an impact load is inputted to the bumper beam 10 from the vehicle front, in a case in which the impact load is relatively small in a low-speed collision or the like, the impact is absorbed only by crushing of the first crash can 6, without any breakage of the front side frame 4. Meanwhile, in a case in which the impact load is so large that the impact cannot be absorbed only by deformation of the first crash can 6, the impact is absorbed effectively by crushing of the front side frame 4. Thus, this structure is configured such that the impact transmitted to a vehicle-compartment side can be restrained.

Further, a power unit 30 is arranged between the left-side front side frame 4a and the right-side front side frame 4b. The power unit 30 is supported at the right-and-left front side frames 4 via supporting members 40 by suspension, for example. Illustrations of the supporting members 40 are omitted in FIG. 1.

An engine, a torque convertor and a transmission, for example, are installed as the power unit 30, and the weight of the power unit 30 is about 10-20% of the whole weight of the vehicle 1.

The structure of the power unit arranged between the right-and-left front side frames of the present invention is not limited especially, as long as a power source of the vehicle is provided. For example, in a case of an electric automotive vehicle, a power unit equipped with a motor and a reduction gear may be installed. In a case of a hybrid vehicle, a power unit equipped with an engine, a motor and a transmission may be installed.

Figure 3:
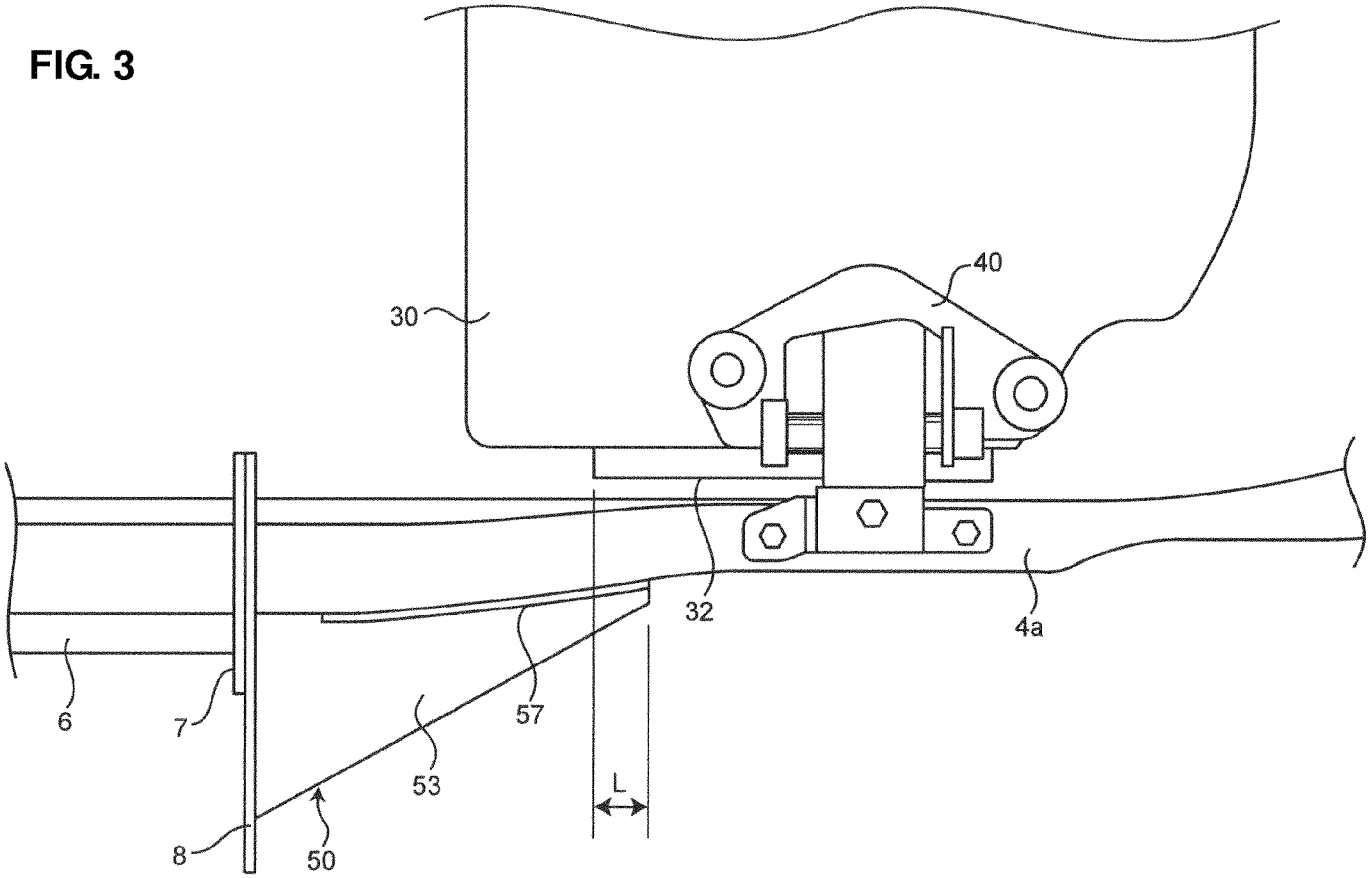
FIG. 3 is an enlarged plan view showing a left-side front side frame and its surrounding portion in the vehicle-body front structure shown in FIG. 1.

FIG. 3 is an enlarged plan view showing the left-side front side frame 4a and its surrounding portion, which shows an example of a specific shape of a left end portion of the power unit 30. As shown in FIG. 3, the power unit 30 includes a parallel face portion 32 which is provided substantially in parallel to the left-side front side frame 4a in a plan view, facing to the left-side front side frame 4a. The parallel face portion 32 is comprised of part of a case of a transmission, for example, but may be comprised of a different member or portion from the power unit 30. Likewise, while illustration is omitted, the power unit 30 includes a parallel face portion at its right end portion, which is provided substantially in parallel to the right-side front side frame 4b in the plan view, facing to the right-side front side frame 4b.

Figure 4:
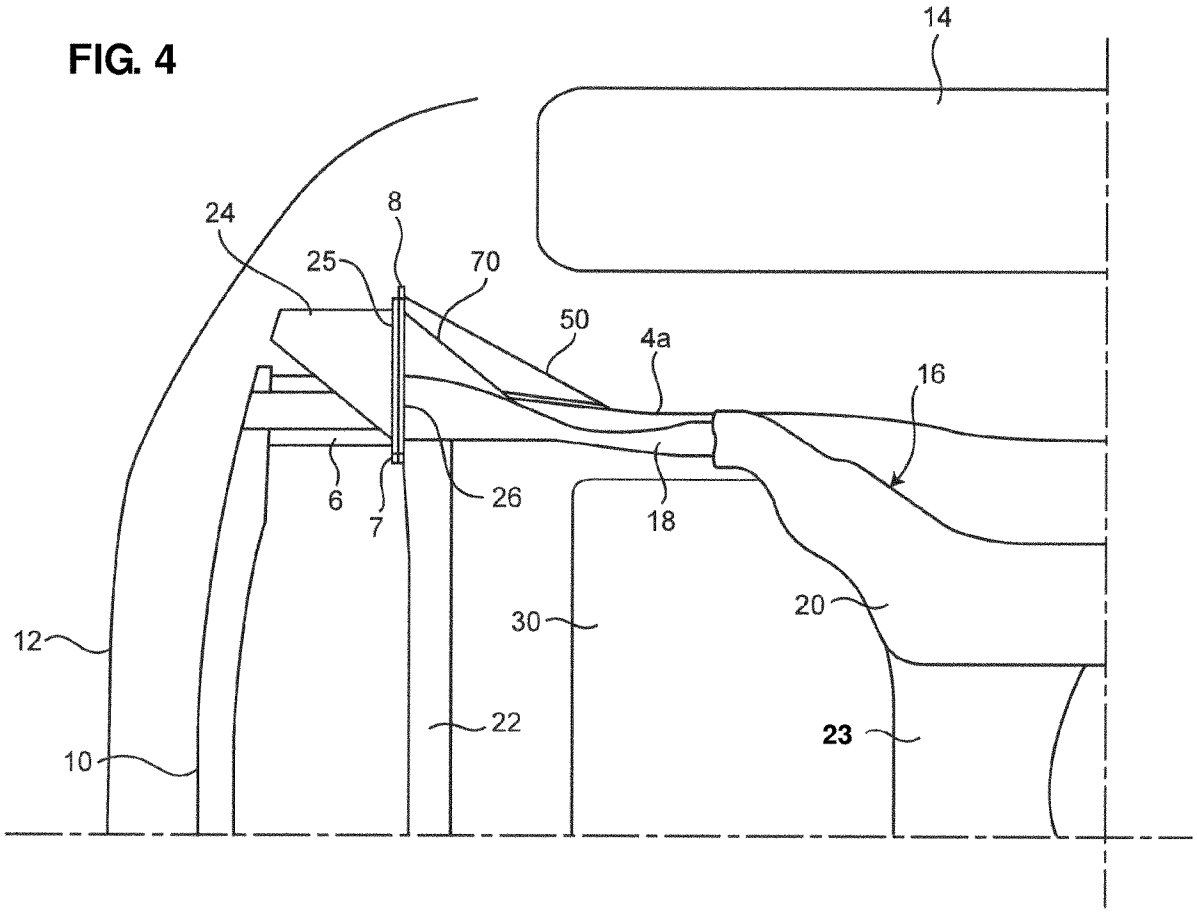
FIG. 4 is a bottom view showing a structure below the left-side front side frame in the vehicle-body front structure shown in FIG. 1.

As shown in the bottom view of FIG. 4, a sub frame 16 supporting suspension members (not illustrated) for front wheels 14 is arranged below the front side frames 4. Herein, while FIG. 4 shows a left half part of the sub frame 16 and its surrounding portion, the right half part of the sub frame 16 and its surrounding portion are similar symmetrically.

The sub frame 16 comprises a pair of left-and-right front longitudinal members 18 which is arranged below the front side frames 4a, 4b to extend in the vehicle longitudinal direction, rear longitudinal members 20 which extend rearward from rear ends of the front longitudinal members 18, a front lateral member 22 which extends in the vehicle width direction, interconnecting front end portions of the left-and-right front longitudinal members 18, and a rear lateral member 23 which extends in the vehicle width direction, interconnecting the left-and-right rear longitudinal members 20.

A second crash can 24, which is of a substantially triangular shape in the plan view, for example, is connected to a front end portion of each of the front longitudinal members 18 of the sub frame 16. A second attaching plate 25 which is arranged along the face substantially perpendicular to the vehicle longitudinal direction is fixed to a rear end portion of the second crash can 24 by welding, for example. A second set plate 26 which is arranged along the face substantially perpendicular to the vehicle longitudinal direction is fixed to a front end portion of the front longitudinal member 18 by welding, for example. The second attaching plate 25 and the second set plate 26, which are arranged to be overlapped each other, are connected by bolts, for example, at a connection portion of the second crash can 24 to the front longitudinal member 18.

The second crash can 24 is arranged below the first crash can 6. Accordingly, the second crash can 24 is also configured to be crushable when the first crash can 6 crushes in the low-speed collision, so that the impact in the low-speed collision can be absorbed more effectively.

The vehicle-body front structure of the vehicle 1 described above further comprises first projection portions 50 which project outward, in the vehicle width direction, from the front side frames 4, and second projection portions 70 which project outward, in the vehicle width direction, from the front longitudinal members 18 of the sub frame 16. Hereafter, structures of the first projection portions 50 and the second projection portions 70 will be described.

At first, the structure of the first projection portions 50 will be described referring to FIGS. 3 and 5-7. Herein, while the structure of the left-side first projection portion 50 which is provided at the left-side front side frame 4a shown in FIGS. 3 and 5-7 will be described, the structure of the right-side first projection portion 50 provided at the right-side front side frame 4b is similar symmetrically.

As shown in FIG. 3, the first projection portion 50, which is of substantially rectangular shape in the plan view, and a side face of the first projection portion 50 which is located on an outward side in the vehicle width direction, i.e., a side wall portion 55, is configured to slant rearward and inward in the plan view.

Figure 8:
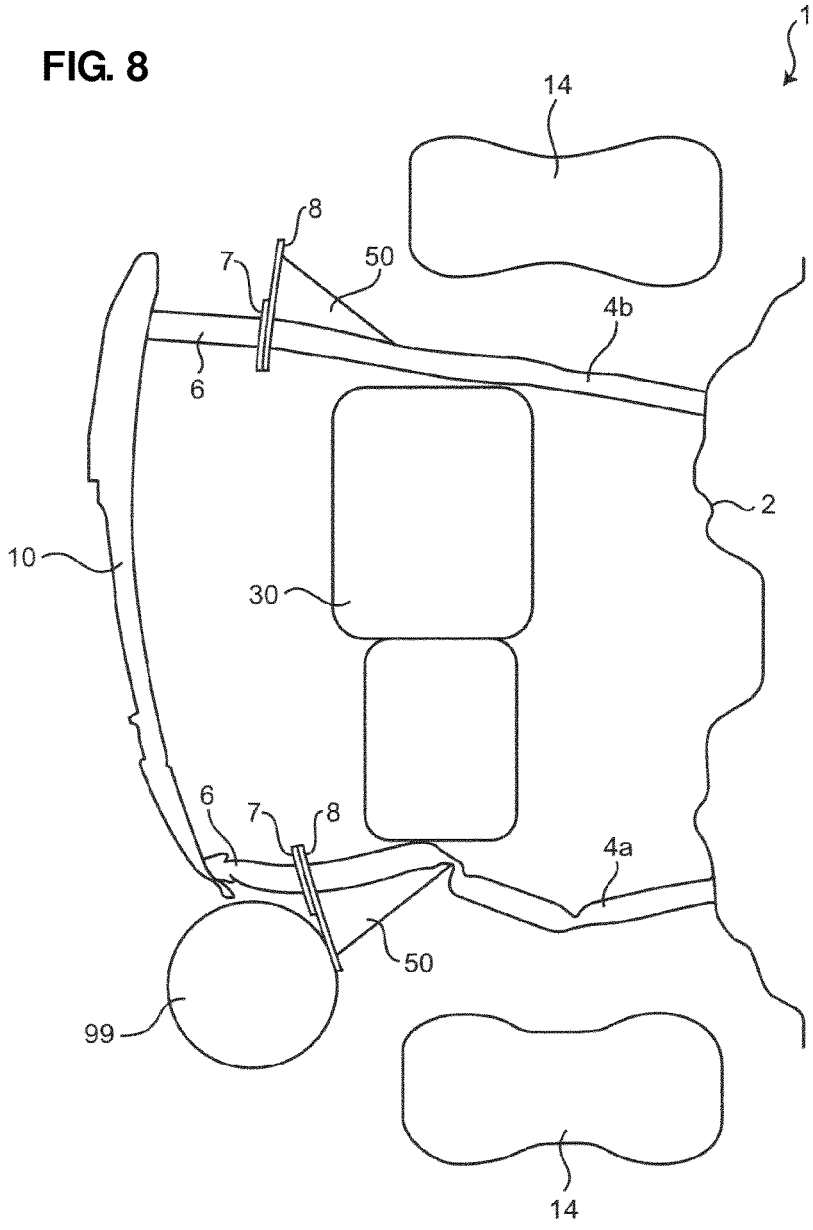
FIG. 8 is a plan view showing an example of a state in which a small overlap collision occurs in the vehicle-body front structure shown in FIG. 1.

Thereby, when the small overlap collision of the vehicle 1 with a pole-shaped object 99 occurs as shown in FIG. 8, for example, the impact load can be received by the first projection portion 50 and effectively transmitted to the front side frame 4.

Returning to FIG. 3, a rear end portion of the first projection portion 50 and a front end portion of the parallel face portion 32 of the power unit 30 are arranged to overlap each other by a length L in the vehicle longitudinal direction. In a range of this overlap, the front side frame 4 and the parallel face portion 32 of the power unit 30 are arranged to face to each other with a substantially constant and small distance. Accordingly, in the small overlap collision, the front side frame 4 being bent by the impact transmitted from the first projection portion 50 and projecting inward can be surely contacted with the parallel face portion 32 of the power unit 30. Thus, the impact load can be received by the heavy-weight power unit 30, so that the front side frame 4 can be deformed stably in a manner shown in FIG. 8, for example. The impact absorption by the front side frame 4 can be surely achieved, and also the load dispersion to the power unit 30 can be achieved.

Further, the front end of the first projection portion 50 is arranged at the same position, in the vehicle longitudinal direction, as the connection portion of the first crash can 6 to the front side frame 4. Accordingly, since the impact from the low-speed collision is absorbed only by the deformation of the first crash can 6, without any damage of the front side frame 4, repair costs can be restrained, avoiding any damage of the first projection portion 50.

Moreover, since the first projection portions 50 are provided in back of the first crash cans 6, the both end portions of the bumper 12 can be arranged in an outside space of the first crash cans 6 without any interference with the first projection portions 50 as shown in FIG. 2. Accordingly, a design can be applied, in which the both end portions of the bumper 12 curve rearward smoothly, passing beside the first crash cans 6 and through both-side spaces in front of the first projection portions 50, for example. Thus, the design flexibility of the vehicle-body front portion can be maintained appropriately.

Figure 5:
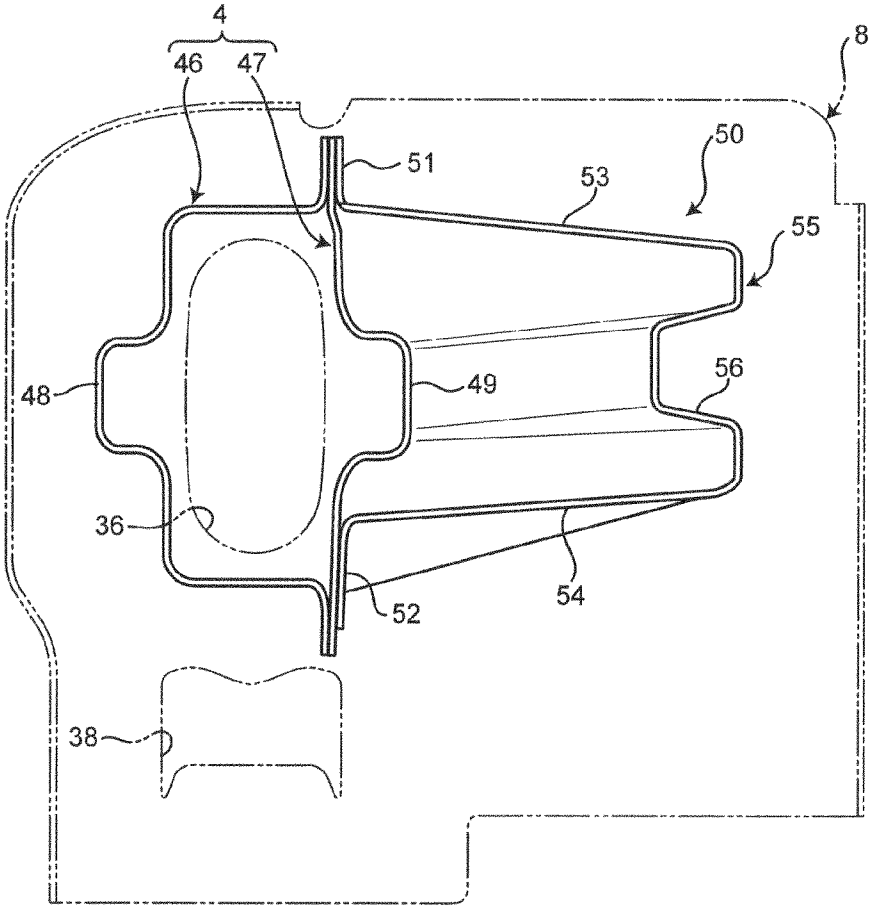
FIG. 5 is an elevational view of the left-side front side frame and a first projection portion, when viewed from a vehicle front side.

As shown in the elevational view of FIG. 5, the first projection portion 50 is made of a member having a U-shaped cross section which comprises a pair of upper-and-lower flange portions 51, 52 joined to a side face of the front side frame 4 which is located on an outward side in the vehicle width direction, an upper wall portion 53 extending outward from a lower end of the upper flange portion 51, a lower wall portion 54 extending outward from an upper end of the lower flange portion 52, and a side wall portion 55 interconnecting outward end portions of the upper wall portion 53 and the lower wall portion 54.

This first projection portion 50 is made by bending forming, for example. Therefore, a high strength material, which may not be applied to press forming, can be used as a material of the first projection portion 50, so that the reduction of the plate thickness of the first projection portion 50, thereby the further weight reduction of the first projection portion 50 can be achieved.

The front end of the first projection portion 50 is joined to the above-described first set plate 8 by welding, for example. Specifically, the upper wall portion 53, the side wall portion 55, the lower wall portion 54 and the lower flange portion 52 are joined to the first set plate 8 by linear welding, for example, at the front end of the first projection portion 50.

As described above, since not only the front side frame 4 but also the first projection portion 50 are joined to the first set plate 8, the first set plate 8 has a shape further extending inward in the vehicle width direction, compared with the conventional structure.

Herein, the first set plate 8 has plural opening portions 36, 38, so that the weight of the first set plate 8 is reduced properly. Further, the front side frame 4 is a tube member comprising a front frame inner 46 and a front frame outer 47 which are joined together. At an inside face of the front frame inner 46 and an outside face of the front frame outer 47 are respectively formed projection portions 48, 49 extending in the vehicle longitudinal direction. Thereby, the strength of the front side frame 4 is increased. Moreover, joining the front side frame 4 to the first set plate 8 is conducted by linear welding of the front frame inner 46 to the first set plate 8, for example.

Figure 6:
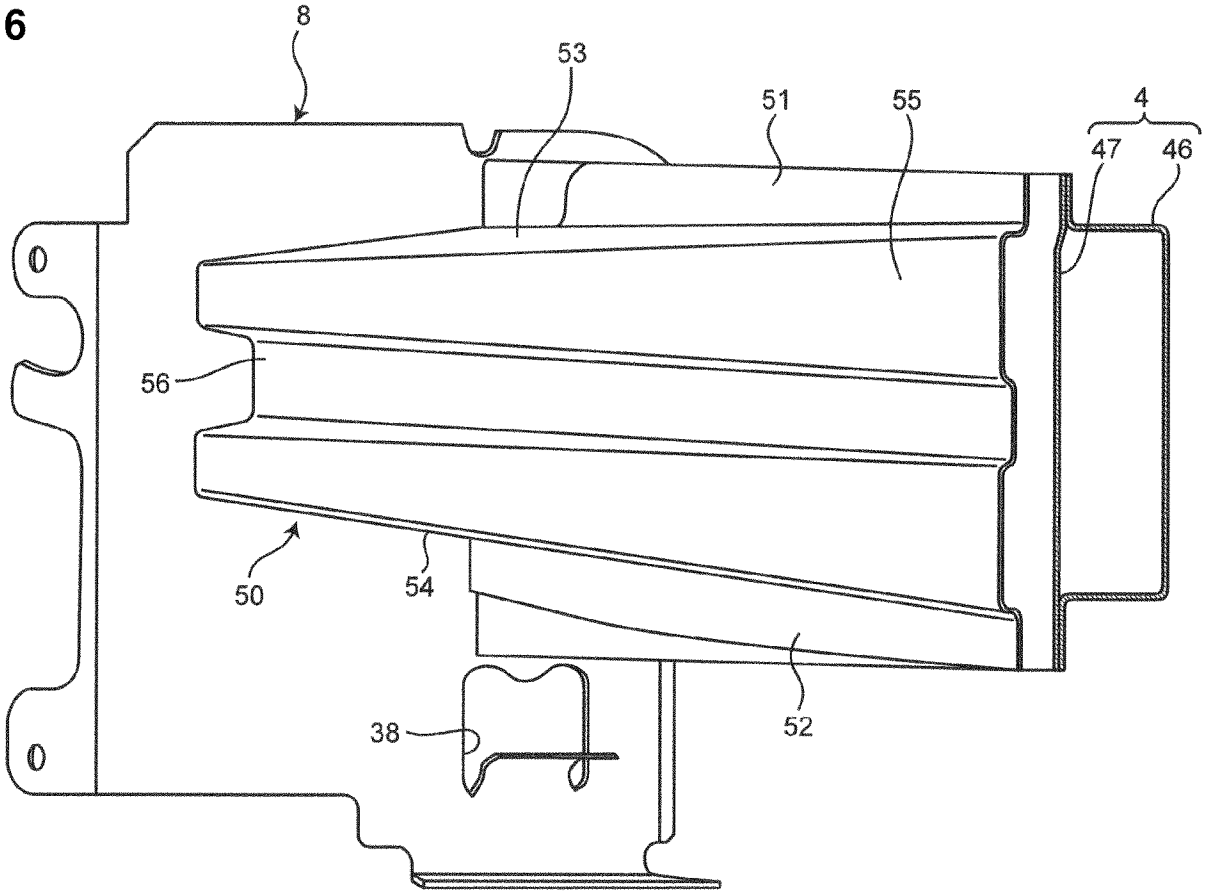
FIG. 6 is a perspective view of the first projection portion shown in FIG. 5 and its surrounding portion, when viewed obliquely from a vehicle outward-and-rearward side.
Figure 7:
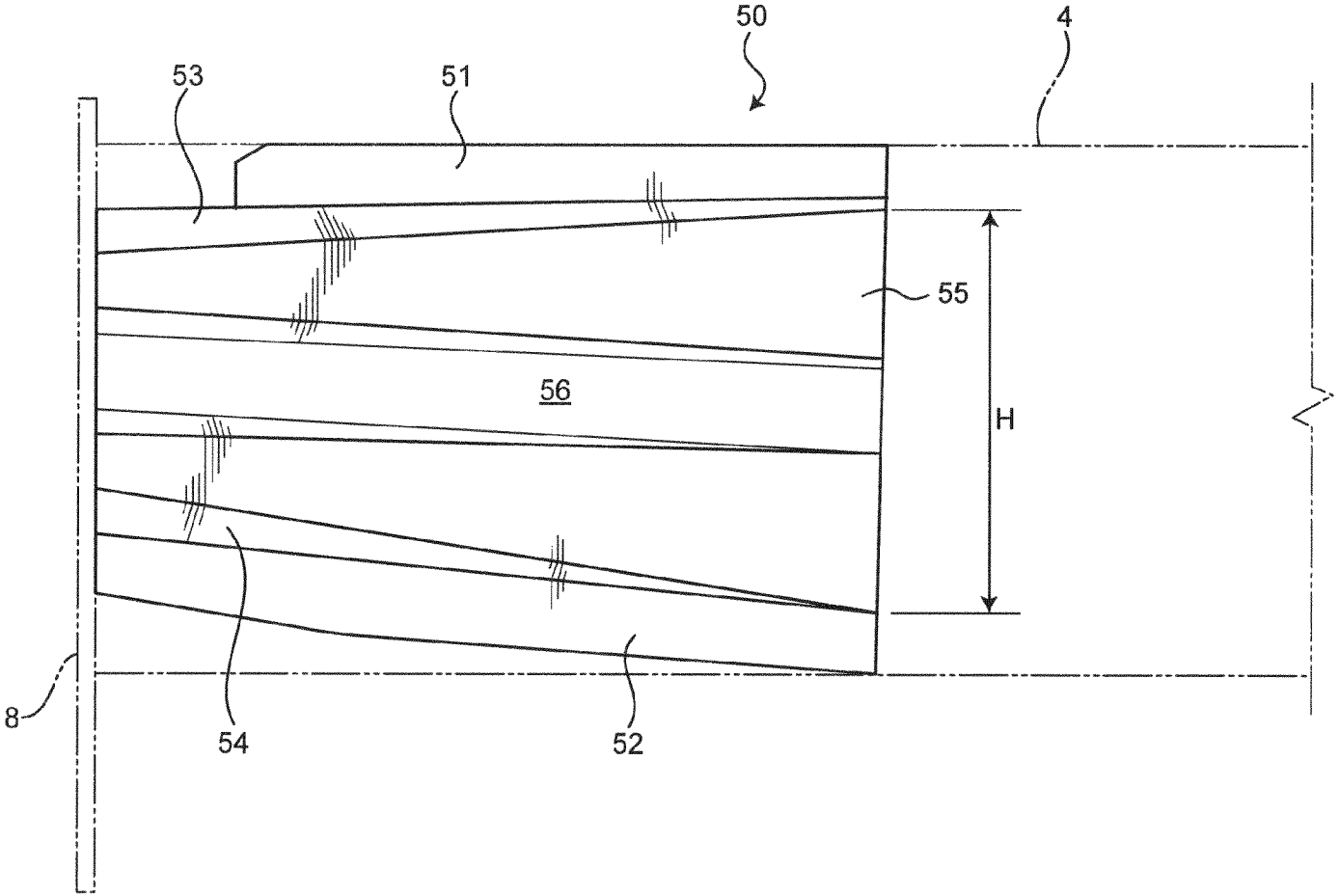
FIG. 7 is a side view of the first projection portion shown in FIG. 5, when viewed from a vehicle outward side.

As shown in FIGS. 6 and 7, the upper-and-lower flange portions 51, 52 of the first projection portion 50 extend in the vehicle longitudinal direction, and are joined to the front frame outer 47 of the front side frame 4 by spot welding applied at plural points in the vehicle longitudinal direction.

The side wall portion 55 of the first projection portion 50 is arranged along substantially in a vertical direction. Further, the side wall portion 55 is formed such that its vertical width H (see FIG. 7) becomes greater gradually toward the vehicle rear. Thereby, the impact load inputted from the front can be dispersed vertically and transmitted rearward by the side wall portion 55. Moreover, since the vertical width of the side wall portion 55 is configured to have the maximum width at a rear end portion of the side wall portion 55, the load transmission from the rear end portion of the side wall portion 55 to the power unit 30 can be achieved in a wide range in the vertical direction. Herein, while the front end portion of the side wall portion 55 is joined to the first set plate 8 as described above, its rear end portion is not joined to the front side frame 4.

A recess groove 56 extending in the vehicle longitudinal direction is formed at a central portion, in the vertical direction, of the side wall portion 55 by means of bead process. Thereby, the strength against the load input from the front is increased. This recess groove 56 is configured such that the depth thereof becomes shallower gradually toward the vehicle rear.

Also, since the first projection portion 50 is the light-weight member having the U-shaped cross section as described above, when the impact load is inputted to the first projection portion 50 from the vehicle front, the load acting on joint portions of the upper-and-lower flange portions 51, 52 of the first projection portion 50 to the front side frame 4 can be reduced.

Further, since the front end portion of the first projection portion 50 and the front end portion of the front side frame 4 are joined to the same first set plate 8 as described above, when the impact load from the small overlap collision is inputted to the first projection portion 50, the impact load is also dispersed to the front side frame 4 via the first set plate 8, thereby avoiding any excessive concentration of the impact load on the first projection portion 50.

Accordingly, it can be avoided that the first projection portion 50 is easily taken off the front side frame 4 even if the impact load is directly inputted to the first projection portion 50 from the object 99 in the small overlap collision, so that the load transmission from the first projection portion 50 to the front side frame 4 can be achieved surely.

Subsequently, the structure of the second projection portion 70 will be described referring to FIG. 4.

As described above, the second projection portion 70 is provided to project outward, in the vehicle width direction, from the front longitudinal member 18 of the sub frame 16. The second projection portion 70 is made of a light-weight member having a U-shaped cross section opening inward, for example.

An inward end portion, in the vehicle width direction, of the second projection portion 70 is joined to the front longitudinal member 18 of the sub frame 16 by linear welding, for example, and a front end of the second projection portion 70 is joined to the second set plate 26 by linear welding, for example.

As described above, since not only the sub frame 16 but also the second projection portion 70 are joined to the second set plate 26, the second set plate 26 has a shape further extending inward in the vehicle width direction, compared with the conventional structure.

The second projection portion 70 is of a substantially triangular shape in the plan view, and configured such that positions of front end and inward end portion of the second projection portion 70 substantially mach those of the first projection portion 50, respectively, but an outward end portion of the second projection portion 70 is located inward from that of the first projection portion 50. That is, the second projection portion 70 is provided to overlap the first projection portion 50 in the plan view.

Accordingly, the impact load from the small overlap collision can be received by the second projection portion 70 as well as the first projection portion 50, so that the impact load can be effectively transmitted from the second projection portion 70 to the sub frame 16, thereby promoting the impact absorption by the sub frame 16. Thereby, the impact load from the small overlap collision can be dispersed and effectively absorbed by the front side frame 4 and the sub frame 16. Consequently, the impact transmitted to the vehicle-compartment side can be reduced more effectively.

Further, since a front end portion of the second projection portion 70 and the front end portion of the sub frame 16 are joined to the same second set plate 26, when the impact load from the small overlap collision is inputted to the second projection portion 70, the impact load is also dispersed to the sub frame 16 via the second set plate 26, thereby avoiding any excessive concentration of the impact load on the second projection portion 70. Accordingly, it can be avoided that the second projection portion 70 is easily taken off the sub frame 16 in the small overlap collision, so that the load transmission from the second projection portion 70 to the front side frame 16 can be achieved surely.

While the second projection portion 70 is configured such that its whole part overlaps the first projection portion 50 in the plan view in the above-described embodiment, another case in which the second projection portion 70 and the first projection portion 50 overlap each other only partially in the plan view can provide the same effect, too.

The present invention should not be limited to the above-described embodiment, and any other modifications or improvements may be applied within the scope of a sprit of the present invention.

Figure 9:
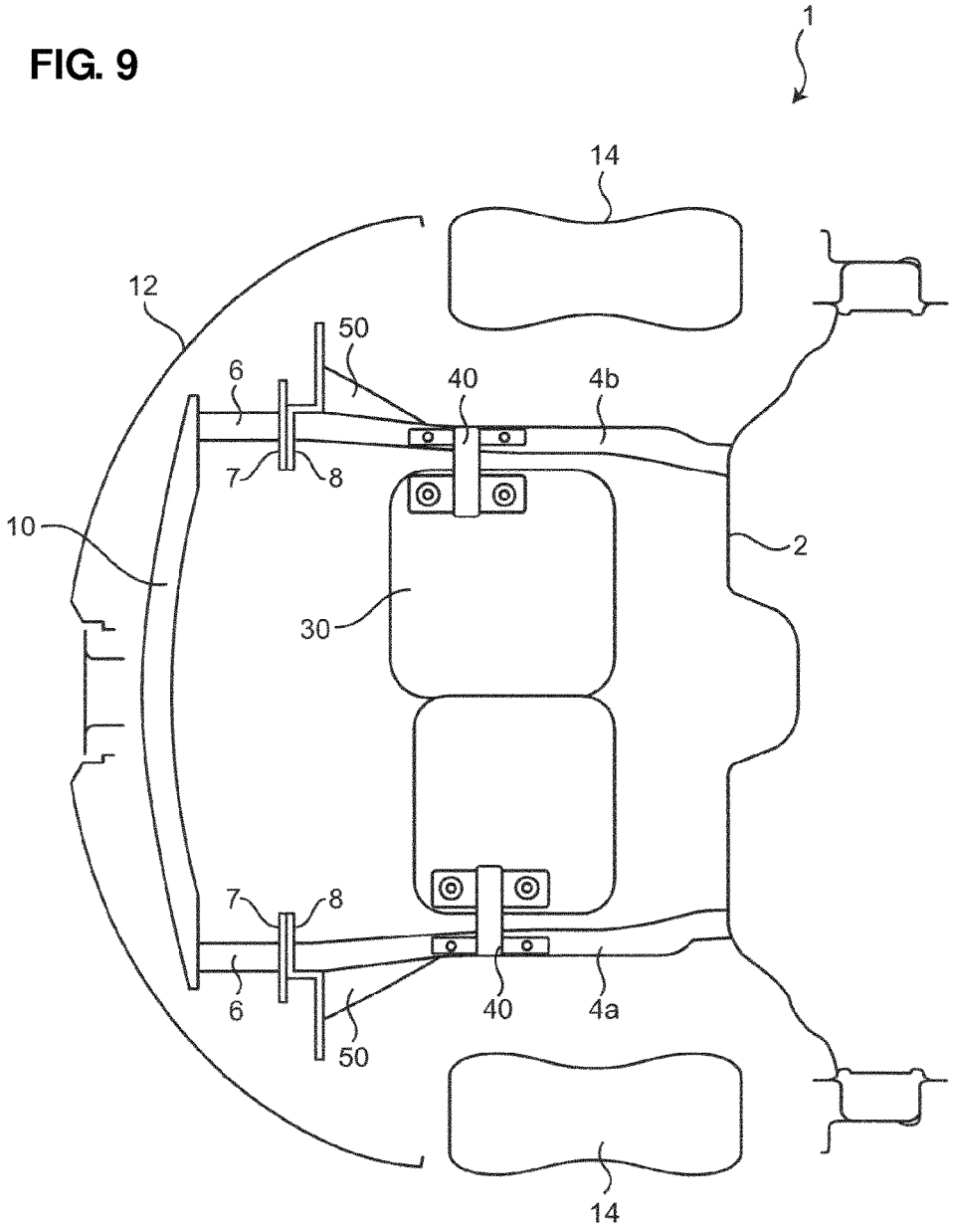
FIG. 9 is a plan view showing a vehicle-body front structure of a vehicle according to another embodiment of the present invention.
Figure 10:
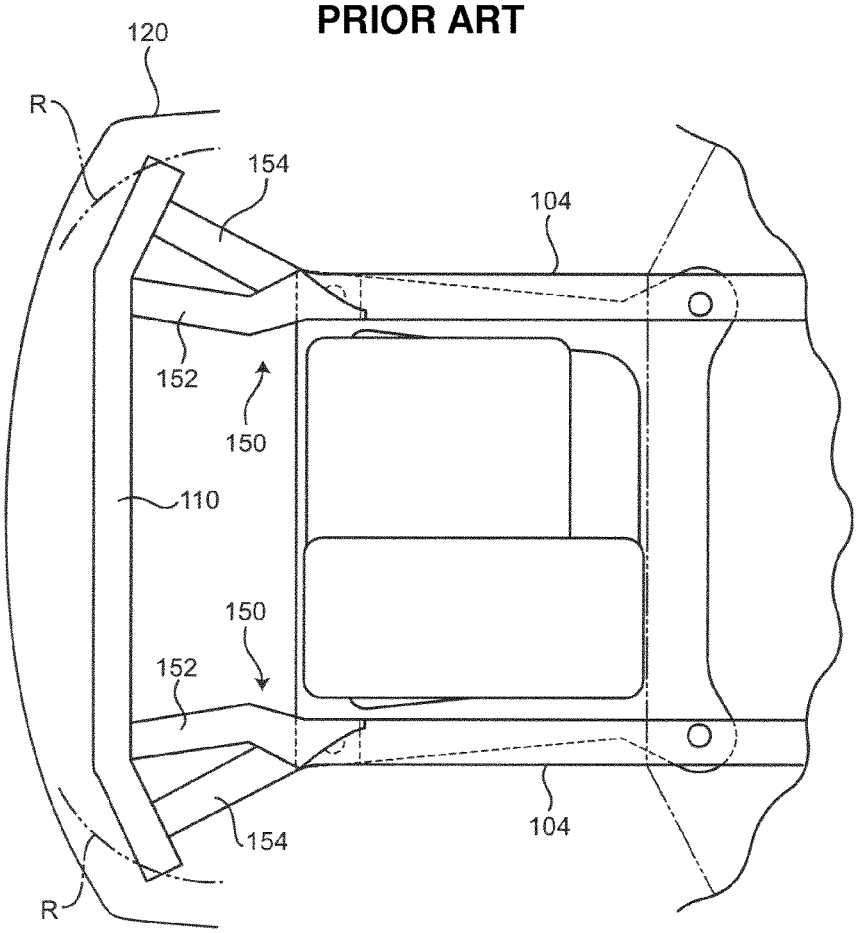
FIG. 10 is a plan view showing a vehicle-body front structure of a vehicle according to a conventional example.

For example, while the above-described embodiment describes the case in which the front end of the first projection portion 50 is provided at the same position as the connection portion of the first crash can 6 to the front side frame 4 in the vehicle longitudinal direction, the front end of the first projection portion 50 may be arranged in back of the connection portion of the first crash can 6 to the front side frame 4 in the vehicle longitudinal direction as shown in FIG. 9. This case can provide the same effect, too. Herein, the first set plate 8 is formed in a bending shape as shown in FIG. 9, so that the front end of the front side frame 4 and the front end of the first projection 50 can be joined to the first set plate 8.

What is claimed is:

1. A vehicle-body front structure of a vehicle, comprising:

a bumper beam *having end portions, said bumper beam being* provided at a front portion of a vehicle body and extending in a vehicle width direction;

a pair of right-and-left front side frames extending in a vehicle longitudinal direction, front end portions of which are connected to [both] *the* end portions of the bumper beam via crash cans*, said front side frames each including a front side frame inner portion and a front side frame outer portion, said front side frame inner portion and said front side frame outer portion defining a closed cross section*;

a power unit arranged between the right-and-left front side frames; and first projection portions projecting outward, in the vehicle width direction, from the front side frames, wherein a front end of each of said first projection portions is located at the same position, in the vehicle longitudinal direction, as a connection portion of said crash can to said front side frame or located in back of said connection portion, a side face of *each of* the first projection [portion which is] *portions which are* located on an outward side in the vehicle width direction is configured to slant rearward and inward in a plan view, the first projection [portion] *portions* and said power unit are arranged to overlap each other in the vehicle longitudinal direction, said first projection [portion is] *portions are* made of a member having a U-shaped cross section which comprises a pair of upper-and-lower flange portions extending in the vehicle longitudinal direction and joined to a side face of *each of* the front side frame [which is] *outer portions which are each* located on an outward side in the vehicle width direction, an upper wall portion extending outward from a lower end of *each of* the upper flange [portion] *portions*, a lower wall portion extending outward from an upper end of the lower flange portion, and a side wall portion interconnecting outward end portions of the upper wall portion and the lower wall portion, and a front end portion of *each of* the first projection [portion] *portions* and a front end portion of *each of* the front side [frame] *frames* are joined to a plate member arranged along a face substantially perpendicular to the vehicle longitudinal direction.

2. The vehicle-body front structure of a vehicle of claim 1, wherein a rear end of *each of* said first projection [portion] *portions* is located in an area where said power unit exists in a side view such that the first projection [portion] *portions* and the power unit are arranged to overlap each other in the vehicle longitudinal direction.

3. The vehicle-body front structure of a vehicle of claim 2, wherein said power unit includes a parallel face portion which is provided substantially in parallel to said front side [frame] *frames* in a plan view, facing to the front side [frame] *frames*, and the rear end of the first projection [portion] *portions* is located in back of a front end portion of said parallel face portion of the power unit such that the first projection [portion] *portions* and the parallel face portion of the power unit are arranged to overlap each other in the vehicle longitudinal direction.

4. The vehicle-body front structure of a vehicle of claim 1, wherein a width, in a vertical direction, of said side wall portion of the first projection [portion] *portions* is configured to have [the] *a* maximum width at a rear end portion of the side wall portion, and a recess groove extending in the vehicle longitudinal direction is formed at the side wall portion of the first projection [portion] *portions* by means of bead process.

5. The vehicle-body front structure of a vehicle of claim 4, wherein a sub frame [supporting a suspension member for a front wheel] is arranged below said front side [frame] *frames*, and a second projection portion projecting outward, in the vehicle width direction, from said sub frame is arranged to overlap said first projection [portion] *portions* at least partially in the plan view.

6. The vehicle-body front structure of a vehicle of claim 1, wherein a sub frame [supporting a suspension member for a front wheel] is arranged below said front side [frame] *frames*, and a second projection portion projecting outward, in the vehicle width direction, from said sub frame is arranged to overlap said first projection [portion] *portions* at least partially in the plan view.

7. A vehicle-body front structure of a vehicle, comprising:

a bumper beam *having end portions, said bumper beam being* provided at a front portion of a vehicle body and extending in a vehicle width direction;

a pair of right-and-left front side frames extending in a vehicle longitudinal direction, front end portions of which are connected to [both] *the* end portions of the bumper beam via crash cans*, said front side frames each including a front side frame inner portion and a front side frame outer portion, said front side frame inner portion and said front side frame outer portion defining a closed cross section*;

a power unit arranged between the right-and-left front side frames; and

*a* first projection [portions] *portion* projecting outward, in the vehicle width direction, from *each of* the front side [frames] *frame outer portions*, wherein a front end of [each of] said first projection [portions] *portion* is located at the same position, in the vehicle longitudinal direction, as a connection portion of said crash [can] *cans* to said front side [frame] *frames* or located in back of said connection portion, a side face of the first projection portion which is located on an outward side in the vehicle width direction is configured to slant rearward and inward in a plan view, the first projection portion and said power unit are arranged to overlap each other in the vehicle longitudinal direction, a sub frame [supporting a suspension member for a front wheel is] arranged below said front side [frame] *frames*, and a second projection portion projecting outward, in the vehicle width direction, from said sub frame is arranged to overlap said first projection portion at least partially in the plan view.

*8. A vehicle-body front structure of a vehicle, comprising:*

*a bumper beam provided at a front portion of a vehicle body and extending in a vehicle width direction,*

*a front side frame extending in a vehicle longitudinal direction, a front end portion of which is connected to an end portion of the bumper beam via a crash can, said front side frame including a front side frame inner portion and a front side frame outer portion, said front side frame inner portion and said front side frame outer portion defining a closed cross section,*

*a first projection portion projecting outward, in the vehicle width direction, from the front side frame outer portion,*

*said first projection portion is made of a member having a U-shaped cross section, said U-shaped cross section having a shape opening towards an inner side in the vehicle width direction, and*

*a front end portion of the first projection portion and a front end portion of the front side frame are directly*

*joined to a plate member arranged along a face substantially perpendicular to the vehicle longitudinal direction.*

*9. The vehicle-body structure of a vehicle of claim 8, wherein when viewed from a front side of the vehicle, the front end portion of said first projection portion is positioned at an inner side of the plate member in the vehicle width direction.*

*10. The vehicle-body structure of a vehicle of claim 8, wherein when viewed from a front side of the vehicle, the front end portion of said first projection portion is wider than the front end portion of the front side frame in the vehicle width direction.*

*11. The vehicle-body structure of a vehicle of claim 8, further comprising:*

*another front side frame extending in the vehicle longitudinal direction, another front end portion of which is connected to another end portion of the bumper beam via another crash can, said another front side frame including another front side frame inner portion and another front side frame outer portion, said another front side frame inner portion and said another front side frame outer portion defining another closed cross section,*

*the another front side frame and the front side frame constitute a pair of right-and-left side frames,*

*another first projection portion projecting outward, in the vehicle width direction, from the another front side frame outer portion,*

*said another first projection portion is made of another member having a U-shaped cross section, and*

*another front end portion of the another first projection portion and another front end portion of the another front side frame are directly joined to another plate member arranged along another face substantially perpendicular to the vehicle longitudinal direction.*

*12. A vehicle-body front structure of a vehicle, comprising:*

*a bumper beam having end portions, said bumper beam being provided at a front portion of a vehicle body and extending in a vehicle width direction;*

*a pair of right-and-left front side frames extending in a vehicle longitudinal direction, front end portions of which are connected to the end portions of the bumper beam via crash cans, said front side frames each including a front side frame inner portion and a front side frame outer portion, said front side frame inner portion and said front side frame outer portion defining a closed cross section;*

*a first projection portion projecting outward, in the vehicle width direction, from each of the front side frame outer portions,*

*said first projection portions are made of a member having a U-shaped cross section, the U-shaped cross section having a shape to open toward an inner side in the vehicle width direction,*

*a front end portion of the first projection portions and a front end portion of the front side frames are joined to a plate member arranged along a face substantially perpendicular to the vehicle longitudinal direction, and*

*the cross section of the first projection portions are enlarged toward the inner side in the vehicle width direction.*

*13. The vehicle-body front structure of a vehicle of claim 12, wherein*

*the U-shaped cross section comprises a pair of upper-and-lower flange portions extending in the vehicle longitudinal direction and joined to a side face of each of the front side frames which is located on an outward side in the vehicle width direction,*

*wherein a front end of the upper flange portion of each of the first projection portions is located on a rear side of a front end portion of a side wall portion of the first projection portion in the vehicle longitudinal direction.*

*14. The vehicle-body front structure of a vehicle of claim 12, wherein*

*the crash cans and the first projection portions are arranged to overlap each other in the vehicle width direction.*

*15. The vehicle-body front structure of a vehicle of claim 12, wherein*

*each of the first projection portions in said vehicle longitudinal direction with the front side frames make up a second closed cross section.*

*16. The vehicle-body front structure of a vehicle of claim 12,*

*wherein a front end of each of said first projection portions is located at the same position, in the vehicle longitudinal direction, as a connection portion of said crash cans to said front side frames or located in back of said connection portion.*

*17. The vehicle-body front structure of a vehicle of claim 12, wherein*

*the U-shaped cross section comprises a pair of upper-and-lower flange portions extending in the vehicle longitudinal direction and joined to a side face of the front side frames which is located on an outward side in the vehicle width direction, an upper wall portion extending outward from a lower end of the upper flange portion, a lower wall portion extending outward from an upper end of the lower flange portion, and a side wall portion interconnecting outward end portions of the upper wall portion and the lower wall portion,*

*wherein the upper wall portion slants upward toward the inner side in the vehicle width direction, and*

*the lower wall portion slants downward toward the inner side in the vehicle width direction.*

*18. A vehicle-body front structure of a vehicle, comprising:*

*a bumper beam having end portions, said bumper beam being provided at a front portion of a vehicle body and extending in a vehicle width direction;*

*a pair of right-and-left front side frames extending in a vehicle longitudinal direction, front end portions of which are connected to the end portions of the bumper beam via crash cans, said front side frames each including a front side frame inner portion and a front side frame outer portion, each said front side frame inner portion with said front side frame outer portion defining a closed cross section;*

*a first projection portion projecting outward, in the vehicle width direction, from each of the front side frame outer portions,*

*a sub frame arranged below said front side frames, and a second projection portion projecting outward, in the vehicle width direction, from said sub frame, and*

*an outward end of the first projection portion is more outward than an outward end of the second projection portion.*

*19. The vehicle-body front structure of a vehicle of claim 18, wherein*

*the crash cans and the first projection portions are arranged to overlap each other in the vehicle width direction.*

* * * * *